TELEPHONE HOOKSWITCH UNIT

Filed Nov. 22, 1965 Sheet 1 of 2

INVENTOR.
BUM SUH PARK

BY

ATTY.

INVENTOR.
BUM SUH PARK
BY C. A. Gulbrandsen
ATTY.

3,422,231

TELEPHONE HOOKSWITCH UNIT

Bum Suh Park, Glen Ellyn, Ill., assignor to Automatic Electric Laboratories, Inc., Northlake, Ill., a corporation of Delaware Filed Nov. 22, 1965, Ser. No. 508,907
U.S. Cl. 179—165 3 Claims
Int. Cl. H04m *1/08;* H01h *1/14*

ABSTRACT OF THE DISCLOSURE

A telephone hookswitch unit consisting of a housing having an open-ended channel extending the full length thereof near one edge, with an actuating bar slidably mounted within the channel. Wire spring members having a helically shaped portion formed near one end thereof are enclosed within the housing, with the helically shaped portions positioned in chambers formed therein, and the other end of the wire spring members engaging the actuating bar. Contact pins are mounted within the housing, adjacent and substantially perpendicular to the wire spring members, for co-operation therewith when the actuating bar is moved. Movement of the other ends of the wire springs by the actuating bar also results in winding the helical portion, whereby the wound helical portion restores the actuating bar when it is released.

This invention relates to switching devices and more particularly to telephone hookswitches.

Presently, hookswitches used in telephone substations include a plurality of leaf-type contact springs which are insulated from one another by means of phenolic insulators. These springs and insulators are held together in what is commonly known as a "pile-up," by means of a screw and nut arrangement. Due to manufacturing differences in thickness of the phenolic insulators and springs or to the amount of pressure supplied by the screw and nut arrangement, the mating of the contact portions of the springs in each pile-up will vary. Because of these variations, the contact springs require critical adjustment when installed in telephone substations in order that they will operate correctly upon the placing on and removing of the handset from the housing of the telephone.

Accordingly, it is the primary object of this invention to provide a new and improved hookswitch which eliminates the need for critical adjustments of hookswitch springs in a telephone substation.

Another object of this invention is to provide a compact, self-contained hookswitch unit.

This invention features a hookswitch unit having a plurality of wire spring members, a molded actuator bar, and pin contacts which are all contained within a compact two-piece molded plastic enclosure or housing.

Other objects and features of this invention will become more apparent by reference to the following description taken in conjunction with the accompanying drawings of which:

Figures 1, 2, 3:
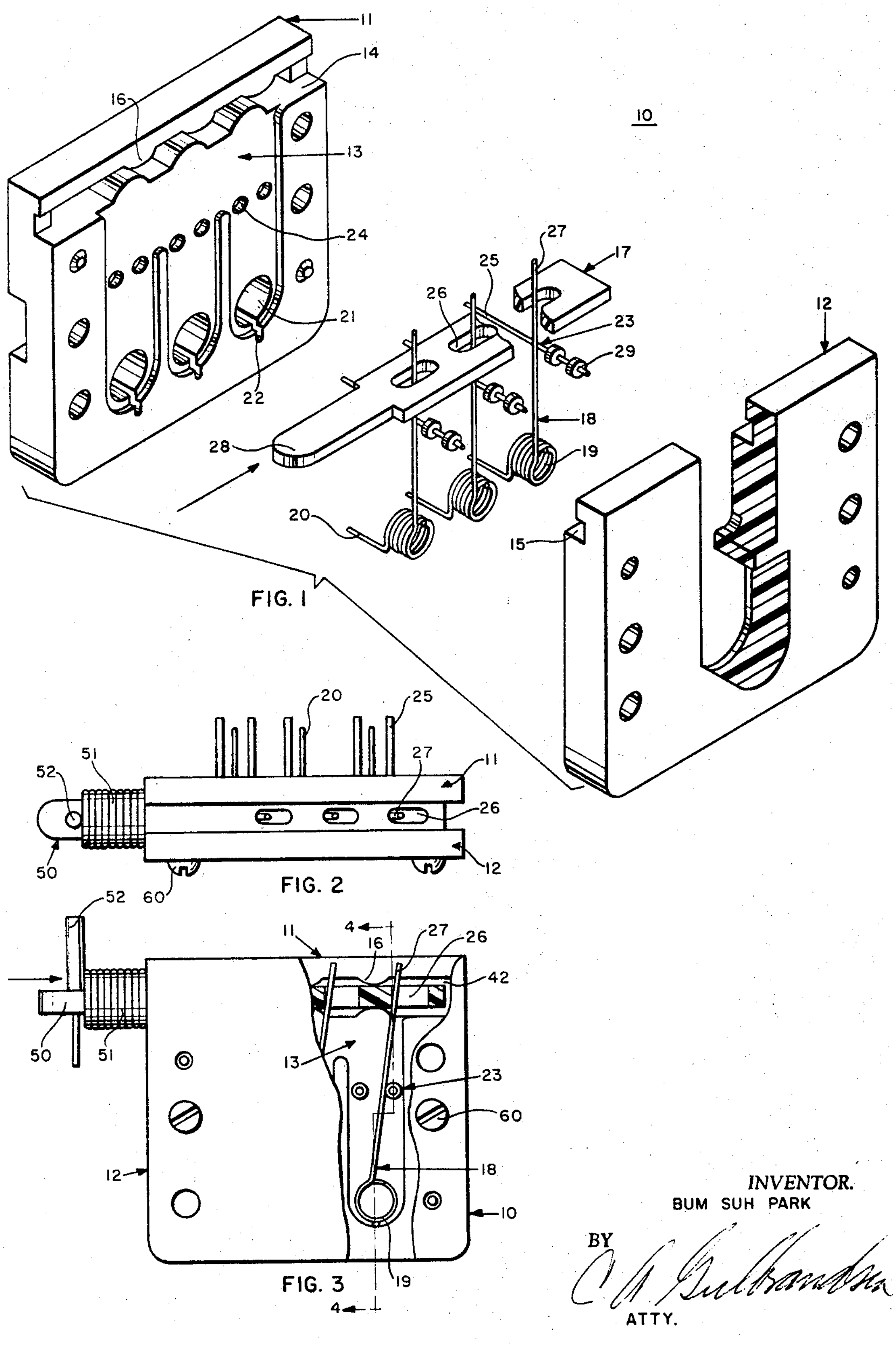
FIG. 1 is an exploded isometric view of a switching device according to the invention.
FIG. 2 is a top view of the switching device having modified actuating means, according to the invention.
FIG. 3 is a sectioned side view of the switching device of FIG. 2.
Figure 4:
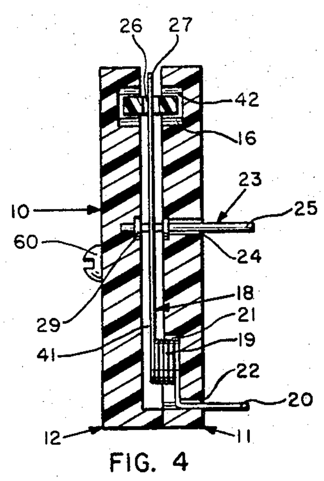
FIG. 4 is a sectioned view of the switching device shown in FIG. 3 taken along the line 4—4.

The switching devices of FIG. 1 and FIGS. 2–4 are primarily the same, differing only in that the device of FIGS. 2–4 has a modified actuator bar 50 and an additional restoring spring 51.

FIG. 1 shows a switching device according to the invention which comprises a housing 10 having two interlocking sections 11, 12. These sections each have a preformed pattern, such as 13 on section 11, on their respective mating surfaces so that when the sections are assembled, chambers such as 41, shown in FIG. 4 are formed. Also formed upon assembling the sections is a channel such as 42. Looking at FIG. 1, one half 14 of the channel is shown in section 11, and the other half 15 is shown in section 12. Guides, such as 16, line the channel and provide a smooth surface so that an actuator bar, such as 17 in FIG. 1 or 50 in FIGS. 2–4, may be slidably mounted therein.

Wire spring members such as 18, having a helically shaped portion 19 which is fitted into apertures, such as 21 in the housing, are mounted at one end 20. This end 20 which is fitted through an aperture such as 22 in section 11 extends outside of the housing and acts as a terminal for making electrical connections thereto.

As mentioned above, an actuator bar, such as 17 or 50, is slidably mounted within channel 42. Looking at FIG. 1, actuator bar 17, which is molded, preferably from a plastic material, has a plurality of apertures such as 26, therethrough. Each of these apertures receives the free end 27, of one of the above-mentioned wire spring members. A portion 28 of actuator bar 17 extends from the housing so that it may be depressed by an outside force.

Contact pins such as 23, are mounted in housing 10. One end 25 of the contact pins are received in apertures such as 24 in housing section 11. End 25 extends outside of the housing to act as a terminal for electrically connecting up the contact pins. The contact pins are held in housing sections 11 and 12 by stop portions such as 29. This can best be seen in FIG. 4 of the drawings. Any number or combination of contact pins may be used in the switching device according to the invention. Looking at FIG. 1, for example, depending in which apertures 24, the contact pins are located the switch can have all makes, all breaks, or a combination of make and break contacts.

Looking at FIG. 2 of the drawings, terminal portions 20 and 25 of the wire spring members and contact pins, respectively, can be seen extending from housing 10. Apertures, such as 26, in actuator bar 50 can be seen receiving the ends 27 of spring members 18. Actuator bar 50 differs from the actuator bar shown in FIG. 1 in that actuator bar 50 has a T-shaped end extending out beyond housing 10. Crossbar 52 comprises the horizontal member of the T and the bar itself comprises the vertical member of of the T. The T shape is provided to secure a coiled spring 51 between vertical crossbar member 52 and housing 10.

FIG. 3 is a sectioned side view of the switching device of FIG. 2. Here crossbar 52 can readily be seen. Screws, such as 60, may be used to hold the sections comprising housing 10 in a locked position.

FIG. 4 which is a view of the device of FIGS. 2 and 3 taken along the line 4—4 of FIG. 3, shows chamber 41 with wire spring member 18 mounted therein. Contact pin 23 can be seen held in place in housing 10 by means of stop portions 29. The free end 27 of wire spring member 23 is shown extending through aperature 26 in actuator bar 50.

Figure 5:
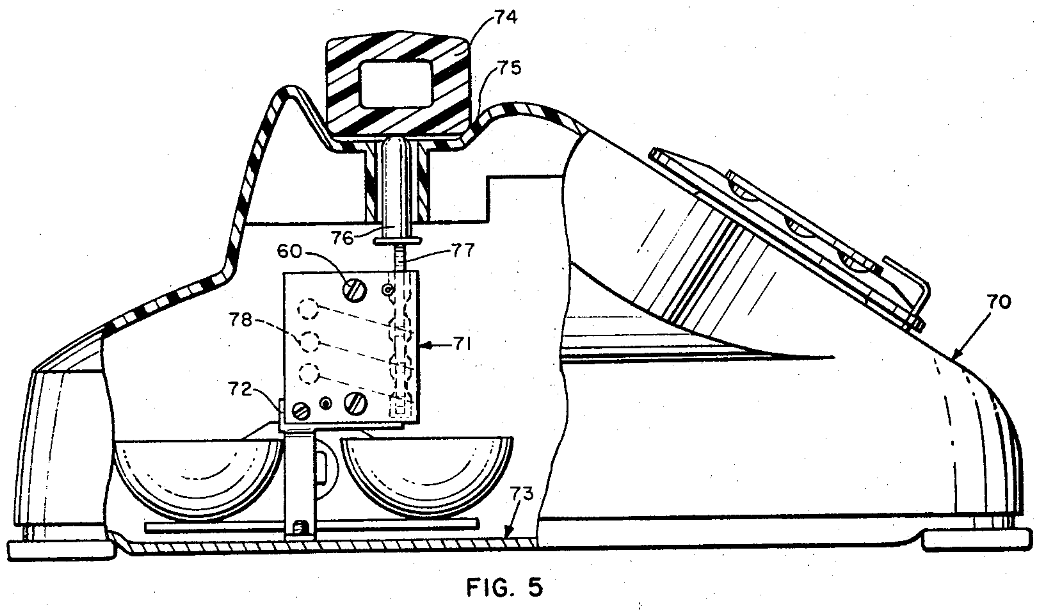
FIG. 5 is a sectioned view of a telephone substation in which the switching device of FIG. 1, is used as a hookswitch, according to the invention.

FIG. 5 shows a telephone substation 70 which has been sectioned to show hookswitch unit 71 mounted therein. Bracket 72 is used to mount hookswitch unit 71 on base 73 of the substation, but other suitable means may also be used.

Handset 74, which is located in cradle portion 75 of the substation is shown depressing plunger 76, which in turn operates hookswitch unit 71.

A more detailed description of the operation of the switching device according to the invention will now be given.

Both embodiments of the switching device (e.g., the one shown in FIG. 1 and the one having the modified actuator bar shown in FIGS. 2–4) operate in the same manner. The actuator bar is depressed e.g. in the direction of the arrow as shown in FIGS. 1 and 3, to activate the switching device. When deactivation is desired the force used to depress the actuator bar is removed and the switching device returns to its normal position.

Looking at this operation more closely, upon depressing the actuator bar 17, in FIG. 1, for example, ends 27 of wire spring members 18, which are made of a suitable contact material, are engaged by the sides of apertures 26, located in actuator bar 17. This tensions the spring members at helical portions 19 and forces the former to make contact with contact pins 23. Upon release of the actuator bar, tensioned wire spring members 18 push against the actuator bar to return it to its normal position. The switching device shown in FIGS. 2–4 is equipped with a modified actuator bar, as mentioned above, which can accommodate an additional restoring spring 51. This coiled spring 51 aids in the return of actuator bar 50 to its normal position. As seen in FIGS. 2 and 3 the switching device is in its operated position with coiled spring 51 being tensioned. Upon release of the force depressng actuator bar 50, both wire spring members 18 and coiled spring 51 will force actuator bar 50 to return to its normal position. Spring 51 and modified actuator bar 50 may be used if a faster return time is desired or merely to insure a prompt return of the actuator bar.

Looking now at FIG. 5, hookswitch unit 71 is essentially the same as the switching device shown in FIG. 1. Here, however, a specific combination of break and make contacts is chosen to achieved the required opening and closing of the telephone circuitry involved. This is accomplished by arranging the contact pins in pre-determined apertures, such as 24 in FIG. 1, as mentioned above.

The hookswitch 71 operates in the same manner as the switching device described above, except that here the activating force is supplied by handset 74 of substation 70. In the position shown in FIG. 5, the weight of handset 74 causes plunger 76 to push against actuator 77 to engage certain ones of the contact pins (not shown) by the tensioned wire spring members 78 (shown dotted). Upon lifting the handset, tensioned springs 78 force actuator bar 77 upward, pushing plunger 76 upward also. This connects the talking circuitry of the substation to the line in the well known manner. Upon replacing handset 74, in cradle portion 75 of the substation, plunger 76 pushes downward against actuator bar 77, which in turn tensions wire spring members 78 against certain ones of, and away from certain other ones of, the contact pins.

As mentioned earlier, with the hookswitch unit according to the invention, no adjustment of the contact springs is needed as in present hookswitches. One of the reasons for this is that both the interlocking housing sections and the actuator bar which is slidably mounted in the housing, are molded and thus can be made to fit together within very close tolerances. Too, the spring members are not held together in a pile-up by a screw and nut arrangement, but instead are located within and are operated by, the above mentioned precisely molded housing and actuator bar, respectively. Also because the spring members are of the wire spring kind and not the flat, leaf-type, they adapt themselves to the environment and will operate correctly even if an error does arise in the aforementioned molded parts.

The hookswitch unit according to the invention is advantageous too because it is a compact unit which requires very little space within the telephone substation. Also because of the rounded shape of the springs and contact pins, and because they are enclosed in a plastic housing, there is a relatively small amount of dust that will accumulate on them, thus a more efficient operation can be expected from the hookswitch unit than from the standard type hookswitches.

It will be obvious to those skilled in the art that changes and modifications may be made without departing from this invention in its broadest aspects and therefore the aim in the appended claims is to cover all such changes and modifications as in the true spirit and scope of this invention.

What is claimed is:

1. A telephone hookswitch unit comprising:
housing means;
at least one wire spring member mounted in said housing means, said member having a straight portion and an adjoining helically shaped portion;
contact means mounted within said housing means adjacent said wire spring member for cooperation therewith;
actuation means movably mounted within said housing means and cooperatively engaging said wire spring member so that upon the activation of said actuating means said spring member engages said contact means;
said housing means including a pair of interlocking sections having mating surfaces, said surfaces forming therebetween a flat chamber of a configuration such as to locate therein said straight portion for deflecting movement in the plane of said flat chamber, and including at least one transverse aperture communicating with said chamber and receiving said helically shaped portion;
and means for anchoring the free end of said helically shaped portion in said housing means.

2. A telephone hookswitch unit as claimed in claim 1, and wherein said anchoring means comprises a slot formed in the periphery and axial to said aperture in one of said sections for receiving said free end of said wire spring member.

3. A switching device comprising: a housing having an open-ended channel therein extending the full length near one edge thereof; an actuating bar slidably mounted within said channel; a plurality of chambers formed within said housing; a plurality of wire spring members each enclosed within a different one of said chambers, and each having near one end a helically shaped portion fixed thereat to said housing, and the other ends engaging said actuating bar each at different locations; and a plurality of contact pins mounted in said housing adjacent and substantially perpendicular to said wire spring members for cooperation therewith; said other ends of said wire springs moved within the corresponding ones of said chambers, in response to a movement in one direction of said actuating bar for engaging the respective adjacent contact pin and winding each individual helical portion so that said wound helical portions restore said actuating bar upon release thereof.

References Cited

UNITED STATES PATENTS 1,581,573 4/1926 Hale ---------------- 179—165
2,076,637 4/1937 Harlow et al. -------- 179—164

KATHLEEN H. CLAFFY, *Primary Examiner.*

BARRY PAUL SMITH, *Assistant Examiner.*

U.S. Cl. X.R.

200—165